(12) United States Patent
Jouin et al.

(10) Patent No.: US 10,296,077 B2
(45) Date of Patent: *May 21, 2019

(54) CONFIGURING POWER DOMAINS OF A MICROCONTROLLER SYSTEM

(71) Applicant: Atmel Corporation, San Jose, CA (US)

(72) Inventors: Sebastien Jouin, La Chapelle-Launay (FR); Patrice Menard, Nantes (FR); Thierry Gourbilleau, Nantes (FR)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,695

(22) Filed: Jun. 2, 2016

(65) Prior Publication Data

US 2016/0274655 A1    Sep. 22, 2016

Related U.S. Application Data

(63) Continuation of application No. 14/043,445, filed on Oct. 1, 2013, now Pat. No. 9,383,807.

(51) Int. Cl.
*G06F 1/32* (2019.01)
*G06F 1/3296* (2019.01)
*G06F 1/3234* (2019.01)
*G06F 1/3228* (2019.01)
*G06F 1/3215* (2019.01)
*G06F 1/3203* (2019.01)

(52) U.S. Cl.
CPC .......... *G06F 1/3296* (2013.01); *G06F 1/3228* (2013.01); *G06F 1/3243* (2013.01); *G06F 1/3203* (2013.01); *G06F 1/3215* (2013.01); *Y02D 10/152* (2018.01)

(58) Field of Classification Search
CPC ................................. G06F 1/3234; G06F 1/32
USPC ......................................................... 713/323
See application file for complete search history.

(56) References Cited

U.S. PATENT DOCUMENTS

| | | | |
|---|---|---|---|
| 4,475,134 A | 10/1984 | Bowden et al. | |
| 4,677,566 A * | 6/1987 | Whittaker | G06F 1/3209 700/295 |
| 4,703,486 A | 10/1987 | Bemis | |
| 5,579,498 A | 11/1996 | Ooi | |
| 5,623,234 A | 4/1997 | Shaik et al. | |
| 6,163,851 A | 12/2000 | Yamazoe et al. | |
| 6,175,891 B1 | 1/2001 | Norman et al. | |
| 6,255,878 B1 | 7/2001 | Gauvin et al. | |
| 6,320,717 B1 | 11/2001 | Feng | |
| 6,393,080 B1 | 5/2002 | Kamoshida et al. | |
| 6,462,830 B1 | 10/2002 | Negishi | |
| RE38,108 E | 5/2003 | Chee | |

(Continued)

OTHER PUBLICATIONS

U.S. Non-Final Office Action in U.S. Appl. No. 13/788,366, dated Apr. 9, 2015, 15 pages.

(Continued)

*Primary Examiner* — Jaweed A Abbaszadeh
*Assistant Examiner* — Volvick Derose
(74) *Attorney, Agent, or Firm* — Fish & Richardson P.C.

(57) ABSTRACT

A microcontroller system is organized into power domains. A power manager of the microcontroller system can change the power configuration of a power domain based on whether the microcontroller system has asserted a power trigger for any module in the power domain or if any module in the power domain has asserted a power keeper.

19 Claims, 5 Drawing Sheets

(56) References Cited

U.S. PATENT DOCUMENTS

| | | |
|---|---|---|
| 6,754,836 B2 | 6/2004 | Shimizu et al. |
| 6,802,014 B1* | 10/2004 | Suurballe .............. G06F 1/3203 713/300 |
| 6,839,013 B1* | 1/2005 | Cummins ........... G06F 11/3656 341/120 |
| 6,848,055 B1 | 1/2005 | Yarch |
| 7,203,855 B2 | 4/2007 | Chou |
| 7,391,250 B1 | 6/2008 | Chuang |
| 7,444,530 B2* | 10/2008 | Deppe ..................... H02J 9/005 348/734 |
| 7,514,958 B1 | 4/2009 | Zhou |
| 7,574,683 B2 | 8/2009 | Wilson |
| 7,770,142 B1 | 8/2010 | Shmayovitsh |
| 7,797,561 B1* | 9/2010 | Abdalla ................ G06F 1/3203 713/322 |
| 7,895,458 B2* | 2/2011 | Kim ...................... G06F 1/3203 326/95 |
| 7,954,078 B1 | 5/2011 | Wang |
| 7,984,317 B2 | 7/2011 | Conroy |
| 8,001,433 B1 | 8/2011 | Bhatia |
| 8,190,931 B2 | 5/2012 | Laurenti et al. |
| 8,255,722 B2 | 8/2012 | Pedersen et al. |
| 8,352,235 B1 | 1/2013 | Lin |
| 8,448,003 B1* | 5/2013 | Rosen ................... G06F 1/3287 713/323 |
| 8,629,796 B1* | 1/2014 | Jouin ................... H03M 1/0624 341/155 |
| 8,683,419 B1 | 3/2014 | Hines |
| 8,791,743 B1 | 7/2014 | Tang |
| 9,774,949 B2* | 9/2017 | Ruan ........................ H04R 3/00 |
| 2003/0006807 A1 | 1/2003 | Masuda et al. |
| 2003/0177404 A1 | 9/2003 | Jorgenson et al. |
| 2003/0183024 A1 | 10/2003 | Lohberg et al. |
| 2003/0198108 A1 | 10/2003 | Hausmann et al. |
| 2004/0148548 A1 | 7/2004 | Moyer |
| 2004/0158773 A1 | 8/2004 | Kang |
| 2004/0225790 A1* | 11/2004 | George ................... G06F 9/4812 710/260 |
| 2005/0083081 A1 | 4/2005 | Jacobson et al. |
| 2006/0184808 A1* | 8/2006 | Chua-Eoan ............ G06F 1/3203 713/300 |
| 2006/0282690 A1* | 12/2006 | Cromer ................. G06F 1/3209 713/300 |
| 2007/0016810 A1* | 1/2007 | Ono ....................... G06F 1/3203 713/300 |
| 2007/0035433 A1* | 2/2007 | Baker ................... G06F 1/3203 341/155 |
| 2007/0260794 A1 | 11/2007 | Ashish et al. |
| 2008/0072094 A1 | 3/2008 | Hayano et al. |
| 2008/0189455 A1 | 8/2008 | Dreps et al. |
| 2008/0211559 A1 | 9/2008 | Tanaka |
| 2009/0089607 A1 | 4/2009 | Rodriguez |
| 2009/0089725 A1 | 4/2009 | Khan |
| 2009/0135751 A1 | 5/2009 | Hodges |
| 2009/0140876 A1 | 6/2009 | Shi |
| 2009/0144571 A1 | 6/2009 | Tatsumi |
| 2009/0153210 A1* | 6/2009 | Wang ......................... G06F 1/32 327/198 |
| 2009/0164814 A1* | 6/2009 | Axford ................ G06F 1/3203 713/320 |
| 2009/0201082 A1* | 8/2009 | Smith ................... G06F 1/3203 327/544 |
| 2009/0204835 A1* | 8/2009 | Smith ................... G06F 1/3203 713/323 |
| 2009/0240959 A1* | 9/2009 | Conroy ................. G06F 1/3203 713/300 |
| 2009/0256607 A1* | 10/2009 | Smith ....................... G06F 1/32 327/198 |
| 2009/0259863 A1 | 10/2009 | Williams et al. |
| 2009/0259982 A1* | 10/2009 | Verbeure .............. G06F 17/505 716/129 |
| 2010/0064160 A1 | 3/2010 | Wilson |
| 2010/0156458 A1 | 6/2010 | Speers |
| 2010/0192115 A1 | 7/2010 | Yang |
| 2010/0229011 A1* | 9/2010 | Pedersen ............... G06F 1/3237 713/322 |
| 2010/0281309 A1* | 11/2010 | Laurenti ............ G06F 11/3013 714/45 |
| 2010/0306570 A1 | 12/2010 | Uchida et al. |
| 2011/0022826 A1 | 1/2011 | More |
| 2011/0060931 A1 | 3/2011 | Radhakrishnan |
| 2011/0131427 A1* | 6/2011 | Jorgenson ................. G06F 1/26 713/300 |
| 2011/0138200 A1 | 6/2011 | Tomizawa |
| 2011/0198923 A1* | 8/2011 | Cheng ....................... G06F 1/26 307/31 |
| 2011/0208888 A1 | 8/2011 | Park |
| 2011/0221483 A1 | 9/2011 | Liu et al. |
| 2011/0252251 A1* | 10/2011 | de Cesare ............. G06F 1/3203 713/320 |
| 2011/0264902 A1 | 10/2011 | Hollingworth |
| 2011/0276812 A1* | 11/2011 | Lee ........................... G06F 1/26 713/300 |
| 2012/0017099 A1 | 1/2012 | David |
| 2012/0047402 A1* | 2/2012 | Chen ..................... G06F 1/3203 714/38.13 |
| 2012/0054511 A1* | 3/2012 | Brinks ....................... G06F 1/26 713/310 |
| 2012/0072743 A1* | 3/2012 | Lee ........................ G06F 1/3287 713/300 |
| 2012/0120958 A1 | 5/2012 | Mahadevan et al. |
| 2012/0122417 A1* | 5/2012 | Yang .................... H04W 52/028 455/352 |
| 2012/0161942 A1 | 6/2012 | Muellner |
| 2012/0185726 A1* | 7/2012 | Duron ................. G06F 11/2028 714/11 |
| 2012/0268995 A1 | 10/2012 | Sugimoto et al. |
| 2012/0322537 A1* | 12/2012 | Antkowiak ......... G07F 17/3225 463/24 |
| 2012/0329509 A1* | 12/2012 | Ravichandran ... H04W 52/0274 455/522 |
| 2013/0063114 A1 | 3/2013 | Agrawal et al. |
| 2013/0067250 A1 | 3/2013 | Wu et al. |
| 2013/0073878 A1* | 3/2013 | Jayasimha ............ G06F 1/3287 713/300 |
| 2013/0097445 A1 | 4/2013 | Palaniappan et al. |
| 2013/0111236 A1* | 5/2013 | Ananthakrishnan .... G06F 13/14 713/320 |
| 2013/0124895 A1* | 5/2013 | Saha ......................... G06F 1/26 713/323 |
| 2013/0159776 A1 | 6/2013 | Gilday |
| 2013/0166939 A1* | 6/2013 | Gendler ..................... G06F 1/10 713/500 |
| 2013/0170413 A1* | 7/2013 | Chow .................. H04W 52/028 370/311 |
| 2013/0297831 A1* | 11/2013 | Laurentiu ............ G06F 13/4282 710/5 |
| 2013/0339589 A1 | 12/2013 | Qawami et al. |
| 2014/0089706 A1 | 3/2014 | Menard et al. |
| 2014/0089707 A1 | 3/2014 | Jouin et al. |
| 2014/0089708 A1 | 3/2014 | Menard et al. |
| 2014/0089714 A1 | 3/2014 | Pedersen et al. |
| 2014/0092507 A1* | 4/2014 | Lefferts ................. H02H 9/046 361/56 |
| 2014/0122833 A1 | 5/2014 | Davis |
| 2014/0167840 A1* | 6/2014 | Machnicki ............ G05B 11/01 327/544 |
| 2014/0173307 A1* | 6/2014 | Machnicki ............ G06F 1/3206 713/320 |
| 2014/0237276 A1* | 8/2014 | Machnicki ............ G06F 1/3234 713/323 |
| 2014/0281648 A1* | 9/2014 | Russell ..................... G06F 1/32 713/340 |
| 2014/0301152 A1 | 10/2014 | Cox et al. |
| 2014/0359044 A1 | 12/2014 | Davis |
| 2015/0082092 A1 | 3/2015 | Sarangi |
| 2015/0082093 A1 | 3/2015 | Sarangi |
| 2015/0095681 A1 | 4/2015 | Jouin et al. |
| 2015/0193357 A1* | 7/2015 | Venas .................. G06F 1/3287 710/8 |

(56) References Cited

U.S. PATENT DOCUMENTS

2015/0220678 A1  8/2015  Srivastava
2015/0378423 A1  12/2015 Hanssen
2016/0147271 A1* 5/2016  Brown ...................... G06F 1/26
                                                713/330

OTHER PUBLICATIONS

U.S. Non-Final Office Action in U.S. Appl. No. 13/786,042, dated Mar. 12, 2015, 14 pages.
U.S. Non-Final Office Action in U.S. Appl. No. 13/785,999, dated Mar. 25, 2015, 12 pages.
U.S. Non-Final Office Action in U.S. Appl. No. 13/789,902, dated May 15, 2015, 15 pages.
U.S. Non-Final Office Action in U.S. Appl. No. 12/400,690, dated Sep. 12, 2011, 7 pages.
U.S. Final Office Action in U.S. Appl. No. 12/400,690, dated Jan. 11, 2012, 7 pages.
U.S. Notice of Allowance in U.S. Appl. No. 12/400,690, dated May 9, 2012, 6 pages.
U.S. Notice of Allowance in U.S. Appl. No. 13/785,999, dated Sep. 10, 2015, 16 pages.
U.S. Non-Final Office Action in U.S. Appl. No. 14/043,445, dated Aug. 25, 2015, 12 pages.
U.S. Final Office Action in U.S. Appl. No. 13/789,902, dated Sep. 2, 2015, 18 pages.
U.S. Final Office Action in U.S. Appl. No. 13/786,042, dated Sep. 10, 2015, 13 pages.
U.S. Notice of Allowance in U.S. Appl. No. 13/788,366, dated Oct. 13, 2015, 20 pages.
U.S. Notice of Allowance in U.S. Appl. No. 13/786,042, dated Jul. 29, 2016, 7 pages.
U.S. Notice of Allowance in U.S. Appl. No. 14/316,625, dated Mar. 6, 2017, 7 pages.

* cited by examiner

CONFIGURING POWER DOMAINS OF A MICROCONTROLLER SYSTEM

CLAIM OF PRIORITY

This application claims priority under 35 USC § 119(e) to U.S. patent application Ser. No. 14/043,445, filed on Oct. 1, 2013, the entire contents of which are hereby incorporated by reference.

TECHNICAL FIELD

This disclosure relates generally to electronics and more particularly to microcontroller systems.

BACKGROUND

Low power consumption is an increasingly important parameter for microcontroller systems. The active power consumption in a microcontroller system is normally dominated by switching activity in the circuit and is proportional to the clock frequency applied to digital logic. Analog modules also contribute a substantially fixed current consumption, which can dominate at low frequencies or in low-power modes. Clocked peripheral modules in the microcontroller system are typically unavailable in ultra-low power, unclocked sleep modes, forcing applications to rely on higher-power clocked modes.

Conventional power reduction solutions for saving power in a microcontroller require that the clock to the Central Processing Unit (CPU) or peripheral modules be switched off, typically by implementing one or more sleep modes in the microcontroller. This solution can be extended until all clocks and analog modules have been switched off, and only leakage current remains, which is typically several orders of magnitude less than active current. The disadvantage of this conventional approach is that the functionality of the device is reduced, since some peripherals are designed to operate with a clock running.

SUMMARY

A microcontroller system is organized into power domains. A power manager of the microcontroller system can change the power configuration of a power domain based on whether the microcontroller system has asserted a power trigger for any module in the power domain or if any module in the power domain has asserted a power keeper.

Particular implementations of the microcontroller system can provide one or more of the following advantages: 1) a microcontroller system can dynamically and flexibly change the power configuration of the microcontroller system power domains to a relevant power configuration, depending on requests to and from modules of the system; 2) the microcontroller system can change a power configuration without intervention from a central processing unit, reducing power consumption and latency; and 3) the microcontroller system can use overlapping triggers and clock requests to reduce hardware complexity.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
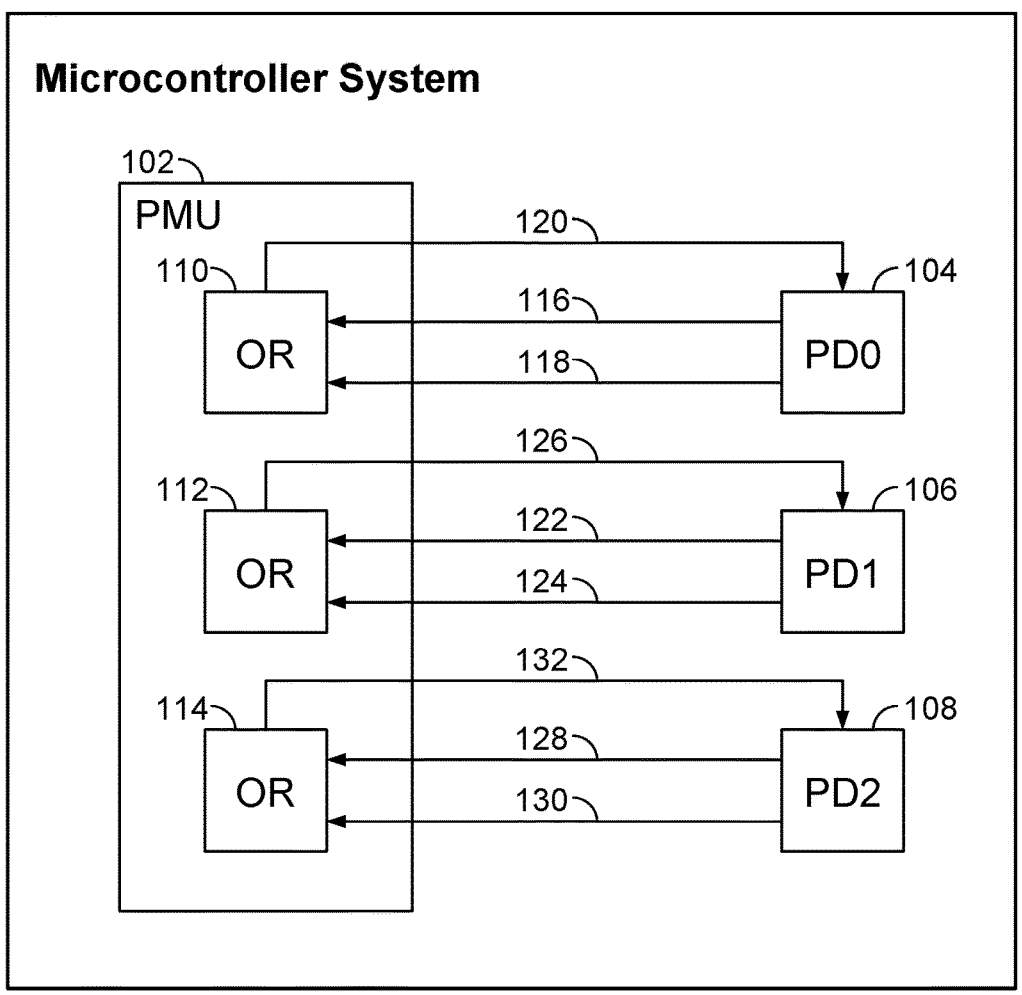
FIG. 1 is a schematic diagram of an example microcontroller system organized into power domains.

FIG. 1 is a schematic diagram of an example microcontroller system 100 organized into power domains 104, 106, and 108. The microcontroller system includes a power manager 102 coupled to each of the power domains.

A power domain can be, for example, one or more modules drawing power from a same power supply, e.g., at a same voltage. The microcontroller can maintain a power configuration for each power domain. A power configuration includes one or more parameters for a power domain specifying, e.g., a higher or lower voltage for the power domain, whether or not a clock is frozen for the power domain, whether certain modules are enabled or disabled or operating in a reduced state for a reduced voltage, and so on. Changing the power configuration of a power domain can adjust the power consumption of a power domain.

In operation, the power manager can change the power configuration of a power domain in response to event triggers from modules inside or outside of the microcontroller system. For example, the power manager can cause a power domain to exit a power saving mode so that one or more modules of the power domain can execute operations. Then the module can cease generating an event to revert the power domain to its previous power configuration or the module can generate a new event to change the power configuration of another domain.

The power manager can change the power configuration of a power domain without intervention from a processor, e.g., a central processing unit (CPU). Hence, instead of activating the processor's power domain to support the processor for changing power configurations, the power manager can change power configurations based on events from event generating modules. This can reduce power consumption of the processor's power domain, and it can reduce latency in changing the power configuration of a requested power domain.

Consider an example scenario where a module receives a trigger to start performing a task. While operating, the module uses a running clock to complete the task. Upon ending the task, the module may set a new trigger to start another module to perform a new task, which may cause a cascade of modules to perform a series of tasks. To reduce the microcontroller system's power consumption, the running clock for the module can be frozen when the module's task is completed.

Since, in some cases, the trigger to start performing the task is received with regular long intervals, switching the module's power domain's power configuration based on the trigger and on the completion of the task can reduce power consumption. The power manager can switch power configurations using power triggers, which indicate that a power domain should be made active, and power keepers, which indicate that a power domain should be kept active.

While the processor is inactive, the power manager can manage the power mode of each of the power domains by placing the power domain into a first power mode if the microcontroller system has asserted a power trigger for any module in the power domain or if any module in the power domain has asserted a power keeper. The power manager places the power domain into a second power mode that uses less power than the first power mode if the microcontroller system is not asserting a power trigger for any module in the power domain and no module in the power domain has asserted a power keeper.

In some implementations, the first power mode is an active mode where the modules of a power domain can perform certain tasks, and the second power mode is a retention mode where the modules of a power domain cannot perform some or all tasks and the modules can retain state information. In some implementations, a module can assert a power keeper by asserting a clock request to provide a clock signal to perform a task. In some implementations, a module can assert a power trigger by requesting another module to perform a task.

A power trigger can be, e.g., directly connected to the power manager for basic sources of triggers or from triggers which are routed, e.g., through an event controller, or from direct memory access (DMA) requests. A power keeper can be, e.g., a clock request of a module to provide a clock to perform a task; a trigger to another module, which can be kept until it has been acknowledged by the other module; an interrupt that can be kept until the processor has handled it; or a DMA request which can be kept until the DMA has handled it.

In the example microcontroller system illustrated in FIG. 1, the power manager includes an OR gate for each power domain; however, the functionality of the power manager can be implemented using any appropriate digital circuit. The first power domain 104, PD0, supplies power triggers 116 and power keepers 118 to the first OR gate 110. The output 120 of the first OR gate toggles the first power domain between the first power mode and the second power mode. The second power domain 106, PD1, supplies power triggers 122 and power keepers 124 to the second OR gate 112. The output 126 of the second OR gate toggles the second power domain between the first power mode and the second power mode. The third power domain 108, PD2, supplies power triggers 128 and power keepers 130 to the third OR gate 114. The output 132 of the third OR gate toggles the third power domain between the first power mode and the second power mode.

Example Microcontroller System

Figure 2:
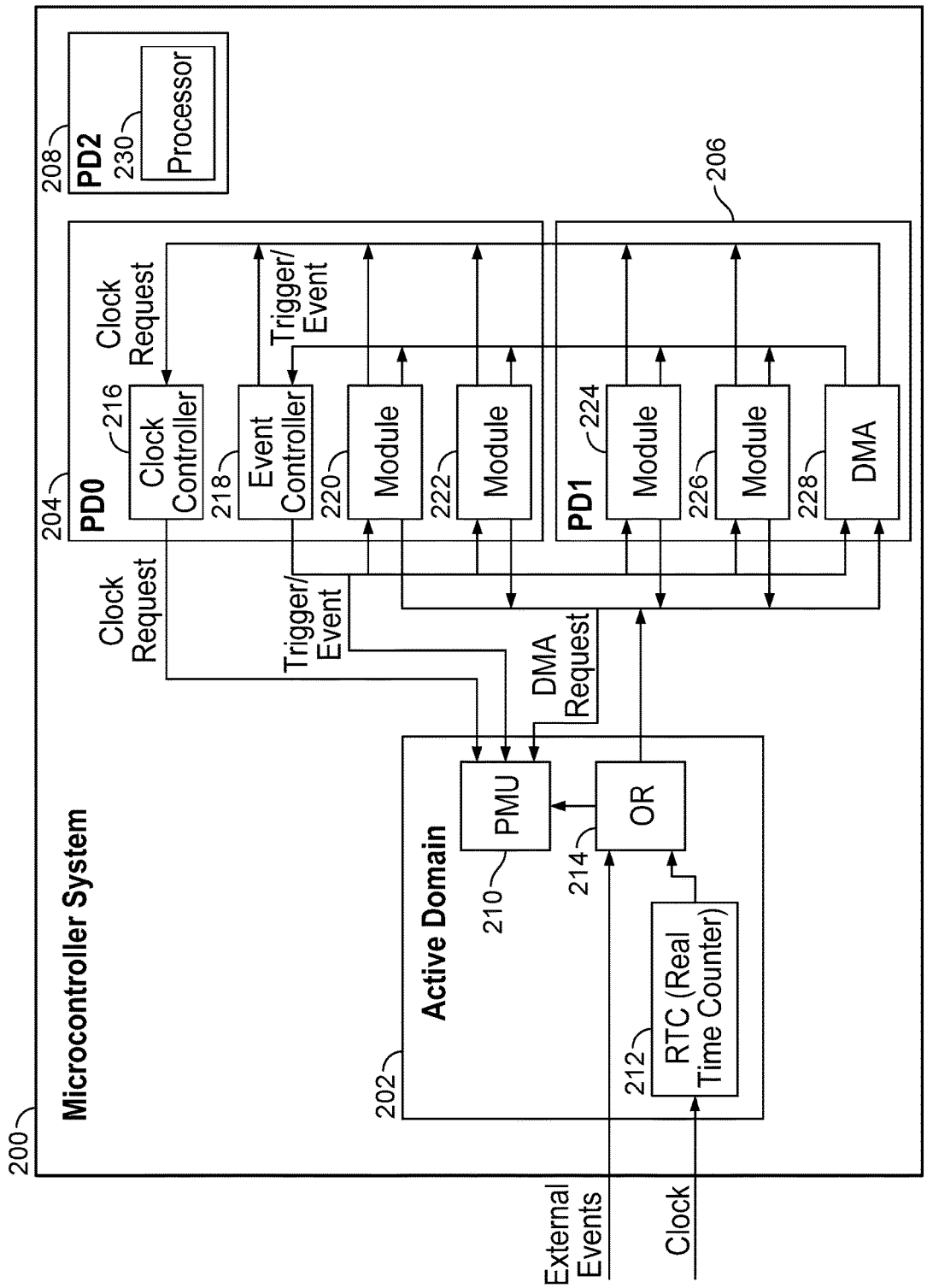
FIG. 2 is a block diagram of an example microcontroller system.

FIG. 2 is a block diagram of an example microcontroller system 200. The example system includes three power domains, including an active domain 202, power domain PD0 204, power domain PD1 206, and power domain PD2 208.

The active domain includes a power manager unit 210, a real time counter (RTC) 212, and an OR gate 214. In some implementations, the active domain is always in an active mode. The active domain can have a relatively small amount of logic to reduce the impact on total power consumption from always being in the active mode. The power manager unit controls the power configurations of the power domains PD0, PD1, and PD2.

The PD0 domain includes a clock controller 216, an event controller 218, and two modules 220 and 222 that can perform one or more of various tasks. For example, one of the modules can be an analog to digital converter (ADC). The clock controller is configured to receive requests from modules for clock signals and then to provide requested clocks to the requesting modules. To get a clock signal, a module requests the clock signal; otherwise the clock can be frozen to reduce power consumption that may be wasted. The event controller routes triggers, which can be events or requests or the like, from a triggering module to an appropriate module depending on the trigger.

The PD1 domain includes two different modules 224 and 226 that can perform one or more of various tasks and a direct memory access (DMA) module 228. The PD2 domain includes a processor 230, e.g., a central processing unit (CPU) for the microcontroller system.

Example Scenario

Figure 3:
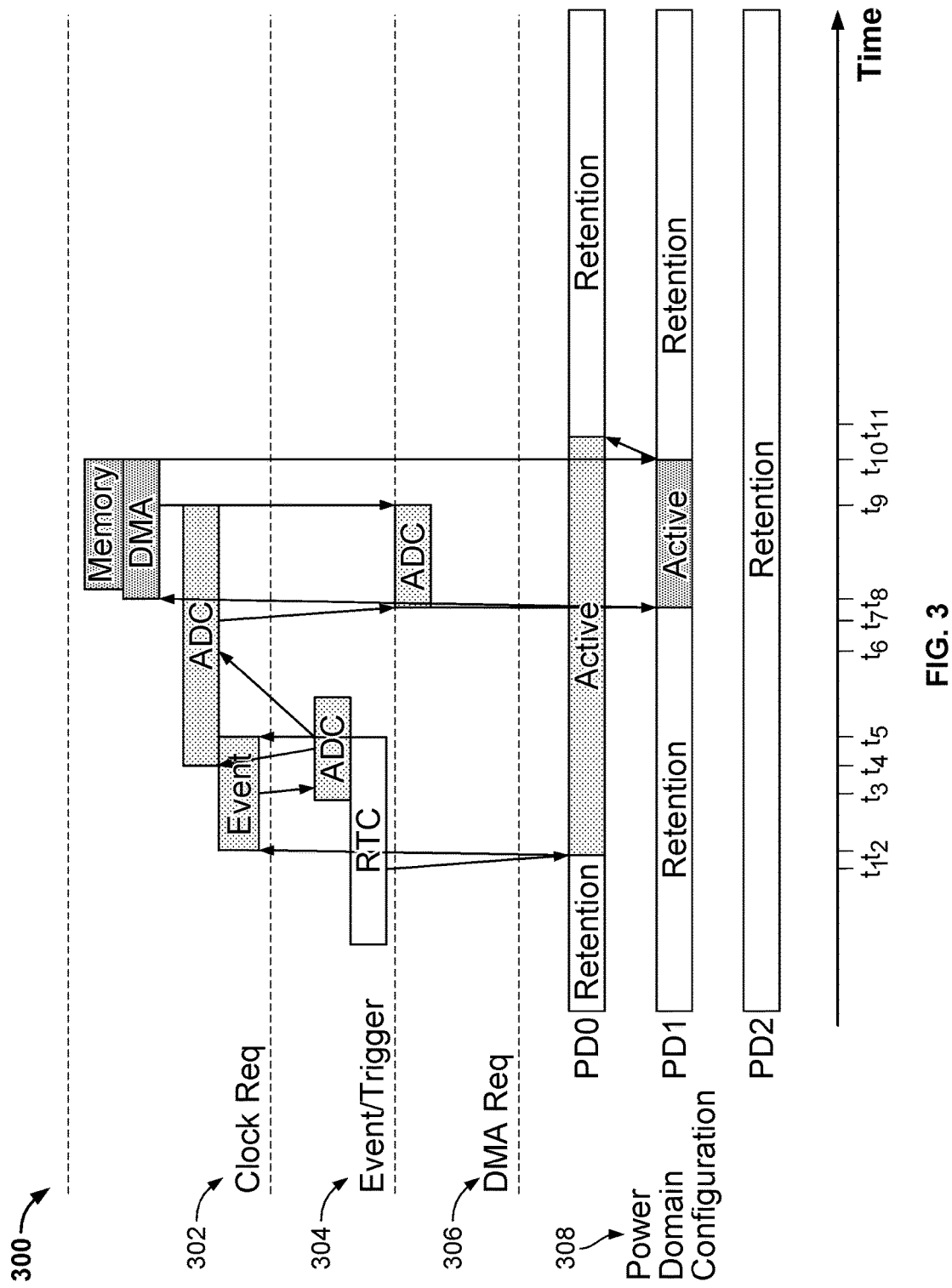
FIG. 3 is a diagram illustrating an example scenario of modules of the example microcontroller of FIG. 2 interacting with each other along a timeline.

FIG. 3 is a diagram illustrating an example scenario 300 of modules of the example microcontroller 200 of FIG. 2 interacting with each other along a timeline. In the example scenario, a periodic trigger from the RTC is sent to the ADC which then performs an analog to digital conversion task. The DMA writes the result of the conversion to a memory.

A first row 302 illustrates clock requests. A second row 304 illustrates triggers. A third row 306 illustrates DMA requests. A fourth row 308 illustrates whether each of the power domains PD0, PD1, and PD2 is in an active mode or a retention mode.

Prior to time t1, all of power domains PD0, PD1, and PD2 are in the retention mode. The RTC generates an event, which is a trigger for the event controller. At time t1, the power manager toggles the PD0 power domain into the active mode so that the event controller is powered and can route the request. At time t2, the event controller then requests a clock from the clock controller. At time t3, when the event controller's clock is running, the event controller routes the RTC event to the ADC.

At time t4, the ADC requests a clock so that it can perform its conversion task. At time t5, the ADC acknowledges the event from the event controller. The ADC continues to assert a power keeper because it maintains its clock request. The event controller can release its clock request after receiving the acknowledgment. At time t6, the ADC completes its task by asserting a DMA request. The DMA request is a power trigger to PD1 as PD1 is in retention mode. The power manager toggles PD1 into the active mode.

At time t7, PD1 is active, and at time t8, the DMA requests its clock, thereby asserting a power keeper to keep PD1 active. At time t9, the DMA executes the transfer from the ADC to the memory. At time t10 the DMA acknowledges the ADC DMA request. At time t10, when the PD1 power triggers are released, the power manager toggles the PD1 power domain into retention mode. In this example scenario, power domain PD0 is configured to only go into retention mode if PD1 is in retention mode, so the power manager toggles power domain PD0 into the retention mode after PD1.

In this example scenario, power domain PD2 is kept in the retention mode. Power domain PD2 includes the processor and may draw a substantial amount of power, so keeping PD2 in the retention mode is useful in reducing overall power consumption. The other power domains PD0 and PD1 are dynamically switched depending on power keepers and power triggers. The sequence can start again for each event, e.g., each periodic event from the RTC.

Example Scenario with Interrupt

Figure 4:
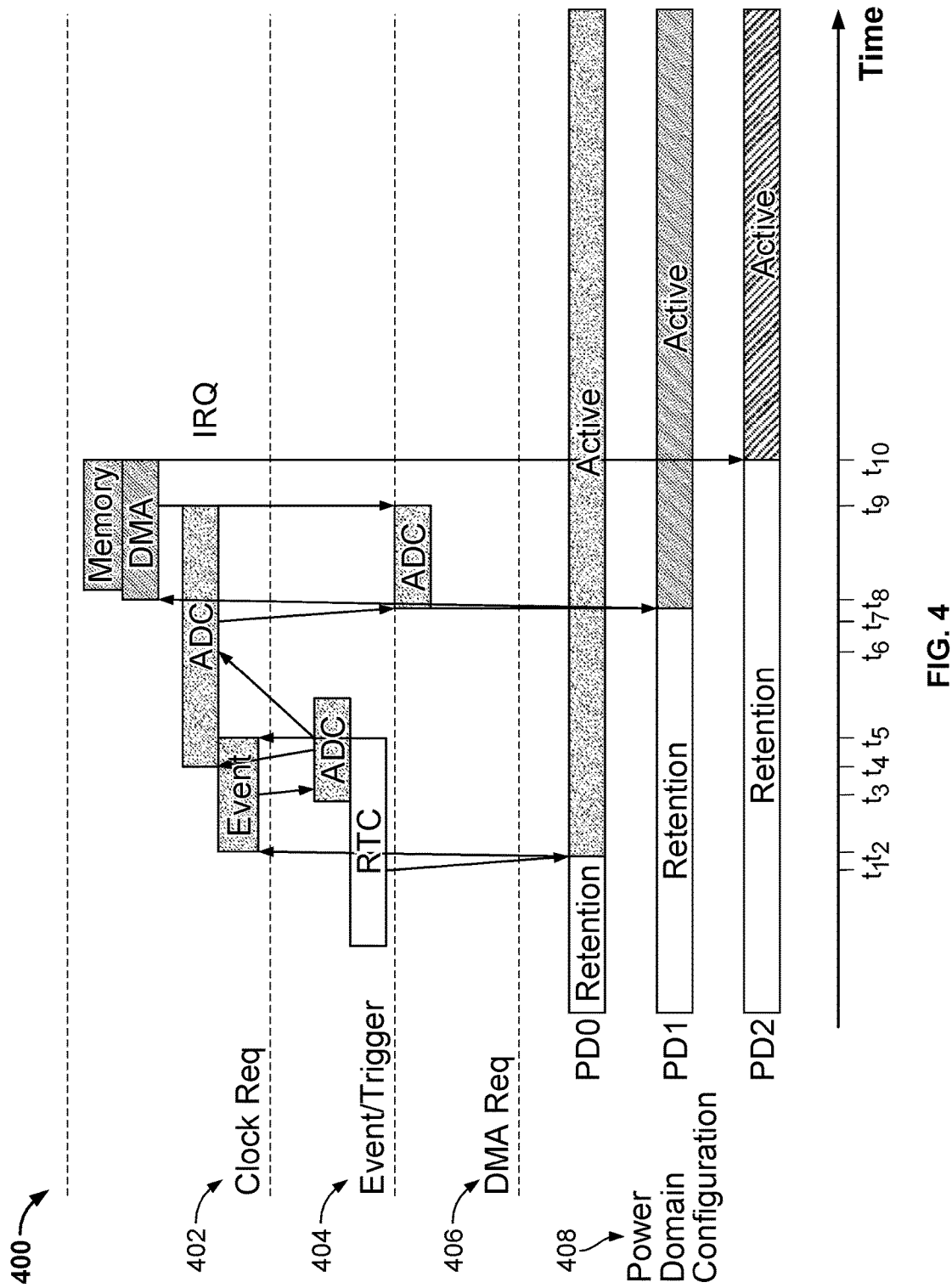
FIG. 4 is a diagram illustrating an example scenario of modules of the example microcontroller of FIG. 2 interacting with each other along a timeline.

FIG. 4 is a diagram illustrating an example scenario 400 of modules of the example microcontroller 200 of FIG. 2 interacting with each other along a timeline. In the example scenario, a periodic trigger from the RTC is sent to the ADC which then performs an analog to digital conversion task. The DMA writes the result of the conversion to a memory.

The scenario follows that sequence of events illustrated in FIG. 3, and then illustrates a situation where, at time t10, the DMA buffer is full and the DMA generates an interrupt. The power manager toggles the PD2 power domain into the active mode so that the processor can request its clock and handle the interrupt.

Example Flowchart—Changing Power Configurations

Figure 5:
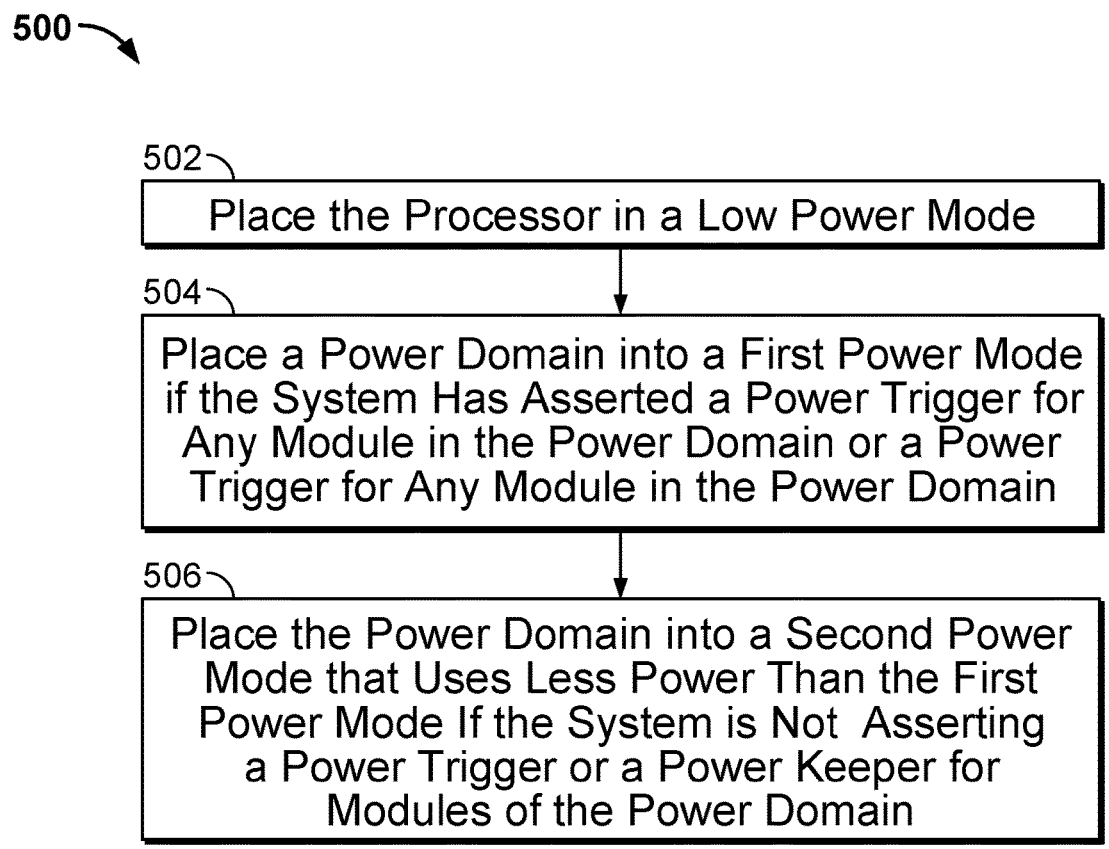
FIG. 5 is a flow diagram of an example process performed by a power manager of a microcontroller system.

FIG. 5 is a flow diagram of an example process 500 performed by a power manager of a microcontroller system. The microcontroller system can be the microcontroller system 100 of FIG. 1 or the microcontroller system of FIG. 2.

The power manager places a power domain including a processor of the microcontroller system into a low power mode so that the processor is inactive (502). This can significantly reduce the power consumption of the system, and since the system includes the power manager to selectively toggle other power domains between power modes, the system can still perform some tasks.

While the processor is inactive, the power manager places each of the other power domains into a first power mode if the microcontroller system has asserted a power trigger for any module in the power domain or if any module in the power domain has asserted a power keeper (504). The power manager places each of the power domains into a into a second power mode that uses less power than the first power mode if the microcontroller system is not asserting a power trigger for any module in the power domain and no module in the power domain has asserted a power keeper (506).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller system comprising:
a clock controller operable to provide a clock signal to a plurality of modules;
an event controller comprising a hardware unit in a first power domain and operable to be powered to route trigger events between the plurality of modules and to route a first trigger event asserted by a first module of the plurality of modules to a second module of the plurality of modules and a second trigger event asserted by a third module of the plurality of modules to a fourth module of the plurality of modules, the fourth module being different from the second module; and
a power manager comprising a digital circuit in an active power domain external to the event controller and the modules, the power manager being operable to change a power configuration of a power domain from a first power mode to a second power mode at least partially based on whether the event controller is routing a trigger event to any module of the power domain, one of the first and second power modes being an active power mode and the other of the first and second power modes being a retention power mode, the active power domain being different from the first power domain and remaining in an active power mode,
wherein the event controller, the power manager, and the modules are integrated in a microcontroller, and
wherein the power manager is operable to change the power configuration of the power domain from the first power mode to the second power mode in response to receiving an event indication from the event controller that the trigger event has been acknowledged and receiving a clock indication from the clock controller that the power domain has relinquished an asserted clock request from any module of the power domain.

2. The microcontroller system of claim 1, wherein the power manager is operable to change the power configuration of the power domain from the first power mode to the second power mode at least partially based on whether the clock controller is responding to a clock request from any module of the power domain.

3. The microcontroller system of claim 1, wherein the power manager is operable to change the power configuration of the power domain from the first power mode to the second power mode in response to receiving an event indication from the event controller that a trigger event has been asserted on a module of the power domain.

4. The microcontroller system of claim 1, further comprising a real time counter (RTC), an analog-to-digital converter (ADC), and a direct memory access module (DMA), and
wherein the ADC and the event controller are in the first power domain and the DMA is in a second power domain.

5. The microcontroller system of claim 4, wherein the power manager is operable to:
change a first power configuration of the first power domain from the retention power mode to the active power mode in response to an RTC event trigger from the RTC, so that the event controller asserts an event clock request on the clock controller and routes the RTC event trigger to the ADC, and then the ADC asserts an ADC clock request on the clock controller and performs a task and asserts an ADC event trigger on the DMA;
change a second power configuration of the second power domain from the retention power mode to the active power mode in response to the ADC event trigger, so that the DMA asserts a DMA clock request on the clock controller and executes a transfer from the ADC to a memory, and then the DMA acknowledges the ADC event trigger; and
change the first and second power configurations of the first and second power domains from the active power mode to the retention power mode in response to the ADC acknowledging the RTC event trigger, the DMA acknowledging the ADC event trigger, and the event controller relinquishing the event clock request, the ADC relinquishing the ADC clock request, and the DMA relinquishing the DMA clock request.

6. The microcontroller system of claim 1, further comprising a real time counter (RTC), an analog-to-digital converter (ADC), a direct memory access module (DMA), and a processor,
wherein the ADC and the event controller are in the first power domain and the DMA is in a second power domain and the processor is in a third power domain.

7. The microcontroller system of claim 6, wherein the power manager is operable to:
change a first power configuration of the first power domain from the retention power mode to the active power mode in response to an RTC event trigger from the RTC, so that the event controller asserts an event clock request on the clock controller and routes the RTC event trigger to the ADC, and then the ADC asserts an ADC clock request on the clock controller and performs a task and asserts an ADC event trigger on the DMA;
change a second power configuration of the second power domain from the retention power mode to the active power mode in response to the ADC event trigger, so that the DMA asserts a DMA clock request on the clock controller and executes a transfer from the ADC to a memory, and then the DMA asserts an interrupt; and
change a third power configuration of the third power domain from the retention power mode to the active power mode so that the processor can handle the interrupt.

8. A microcontroller system comprising:
a plurality of modules organized into a plurality of power domains and a power manager coupled to the modules and operable to:
determine that a first power domain is to be in a first power mode based on at least one of: a trigger asserted by a first module of the plurality of modules to a second module in the first power domain to perform a task, or an indication that the first power domain is to be maintained in the first power mode; and
determine that a second power domain is to be in a second power mode based on a lack of a trigger for any module in the second power domain and a lack of an indication that the second power domain is to be kept in the first power mode, the second power mode being associated with a degree of power usage that is less than a degree of power usage associated with the first power mode,
wherein a third module of the plurality of modules in a third power domain is operable to:
while the third power domain is in the second power mode, receive a first trigger to perform a first task;
after the power manager puts the third power domain into the first power mode, assert a clock request to the power manager to keep the third power domain in the first power mode;
acknowledge the first trigger; and
perform the first task, and
wherein the power manage is operable to change a power configuration of a power domain from the first power mode to the second power mode in response to receiving an event indication from an event controller that a trigger event asserted on a module of the power domain has been acknowledged and receiving a clock indication from a clock controller that the power domain has relinquished an asserted clock request from any module of the power domain.

9. The microcontroller system of claim 8, wherein the third module is operable to:
after performing the first task, relinquish the clock request so that the power manager can put the third power domain back into the second power mode.

10. The microcontroller system of claim 8, wherein the third module is operable to:
assert a second trigger on a fourth module in a fourth power domain; and
after performing the first task and receiving an acknowledgement for the second trigger, relinquish the clock request so that the power manager can put the third power domain back into the second power mode.

11. The microcontroller system of claim 8, wherein the first power mode is an active mode in which modules of a power domain can perform a first plurality of tasks, and
wherein the second power mode is a retention mode in which modules of a power domain cannot perform a second plurality of tasks and the modules can retain state information.

12. The microcontroller system of claim 8, further comprising a processor, wherein the power manager is operable to manage a power configuration of each of the power domains while the processor is inactive.

13. The microcontroller system of claim 8, wherein the trigger is asserted by the first module to the second module through the event controller operable to route triggers between the plurality of modules.

14. A method comprising:
determining, by a power manager of a microcontroller system including a plurality of modules organized into a plurality of power domains, that a first power domain is to be in a first power mode based on at least one of: a trigger asserted by a first module of the plurality of modules to a second module in the first power domain to perform a task, or an indication that the first power domain is to be maintained in the first power mode;
determining, by the power manager, that a second power domain is to be in a second power mode based on a lack of a trigger for any module in the second power domain and a lack of an indication that the second power domain is to be kept in the first power mode, the second power mode being associated with a degree of power usage that is less than a degree of power usage associated with the first power mode;
receiving, by a third module of the plurality of modules in a third power domain, a first trigger to perform a first task, while the third power domain is in the second power mode;
after the power manager puts the third power domain into the first power mode, asserting, by the third module, a clock request to the power manager to keep the third power domain in the first power mode;
acknowledging, by the third module, the first trigger; and
performing, by the third module, the first task; and
changing, by the power manager, a power configuration of a power domain from the first power mode to the second power mode in response to receiving an event indication from an event controller that a trigger event asserted on a module of the power domain has been acknowledged and receiving a clock indication from a clock controller that the power domain has relinquished an asserted clock request from any module of the power domain.

15. The method of claim 14, further comprising:
after performing the first task, relinquish, by the third module, the clock request so that the power manager can put the third power domain back into the second power mode.

16. The method of claim 14, further comprising:
asserting, by the third module, a second trigger on a fourth module in a fourth power domain; and
after performing the first task and receiving an acknowledgement for the second trigger, relinquishing, by the third module, the clock request so that the power manager can put the third power domain back into the second power mode.

17. The method of claim 14, wherein the first power mode is an active mode in which modules of a power domain can perform a first plurality of tasks, and
wherein the second power mode is a retention mode in which modules of a power domain cannot perform a second plurality of tasks and the modules can retain state information.

18. The method of claim 14, wherein the microcontroller system comprises a processor, and the method further comprising:
managing, by the power manager, a power configuration of each of the power domains while the processor is inactive.

19. The method of claim 14, wherein the trigger is asserted by the first module to the second module through the event controller operable to route triggers between the plurality of modules.

* * * * *